Sept. 1, 1964

S. J. FENTON ETAL 3,147,384

FLASH DETECTION AND LOCATION SYSTEM

Filed Jan. 10, 1962

INVENTORS
STUART J. FENTON
ARTHUR P. STOLIAR
BY
ATTORNEY

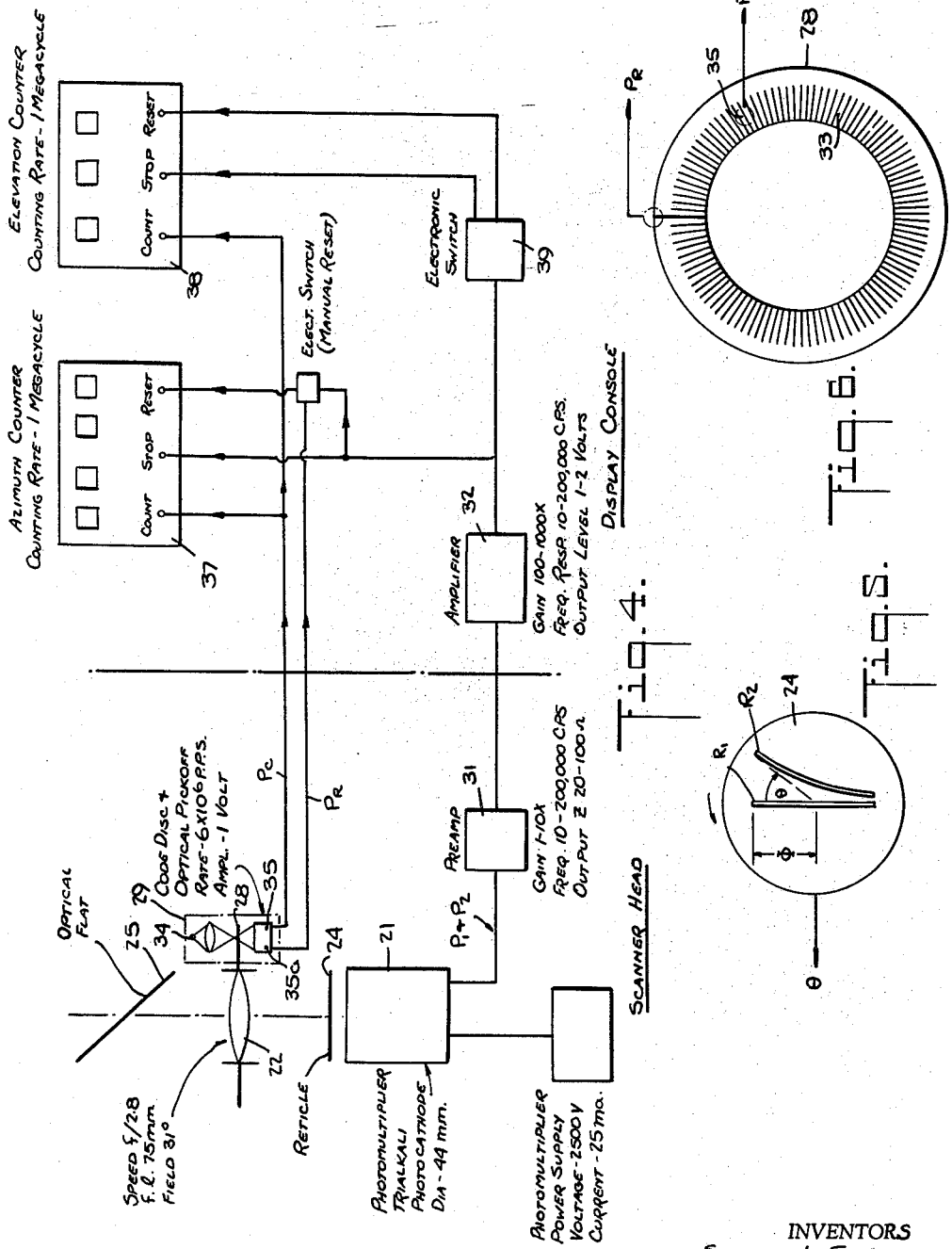

United States Patent Office 3,147,384
Patented Sept. 1, 1964

3,147,384
FLASH DETECTION AND LOCATION SYSTEM
Stuart J. Fenton, Great Neck, and Arthur P. Stoliar, New York, N.Y., assignors to Bulova Watch Company, Inc., New York, N.Y., a corporation of New York
Filed Jan. 10, 1962, Ser. No. 165,356
9 Claims. (Cl. 250—203)

This invention relates generally to infra-red and light sensitive systems for detecting and locating point sources of radiation, and more particularly to an early warning scanning device capable of locating a source of radiation both in azimuth and elevation.

It is well known to use infra-red techniques for detecting radiation sources. Where the source of radiation is transitory in nature and of extremely brief duration, as in the case of a gun flash, existing infra-red detection devices have difficulty in accurately locating the source of radiation. Existing devices are also relatively complex in design and cumbersome, and they are not sufficiently compact to be carried say in military tanks and other types of mobile armament systems.

Accordingly, it is the main object of this invention to provide a scanning device adapted to detect and accurately locate point sources of infra-red and visible radiation, such as gun flashes or searchlights, the device being effective even when the emission of the radiant energy is of extremely brief duration.

More specifically, the object of this invention is to provide a scanner capable of determining the position of a point source of radiation precisely in coordinate terms of azimuth and elevation. A significant advantage of the invention is that it is usable in conjunction with fire control apparatus in a tank to provide early warning information to a tank crew as to the existence and placement of gun flashes, searchlights or other radiation emitting targets.

Yet another object of the invention is to provide a scanner which is of simple, efficient, reliable and compact design and which may be mass-produced at low cost.

Briefly stated these objects are attained by an infrared scanning unit having an optical system including a vertical slit and an adjacent inclined slit, the scanner rotating about a vertical axis of high speed to scan the horizon. As scanning progresses, periodic electrical pulses are concurrently generated and counted, whereby a gun flash is picked up through the vertical slit when the unit is in line therewith, the accumulated pulse count at the instant affording an index to the azimuth position. Elevation is determined by measuring in terms of pulses the time it takes for the same flash to be detected in the inclined slit, the greater the count the higher the elevation of the point source relative to the scanner. Thus the azimuth and elevation readings are developed sequentially in the course of a single scan. While omnidirectional scanning is disclosed herein, it is to be understood that the invention is also operable with sector scanning.

For a better understanding of the invention, as well as other objects and further features thereof, reference is made to the following detailed description to be read in conjunction with the accompanying drawing, wherein like components in the various views are identified by like reference numerals.

In the drawing:

FIG. 4 is a block diagram of the entire scanning system;

FIG. 5 is a separate showing of the slit or reticle configuration, and

FIG. 6 is a separate view of the pulse coding disc.

Figure 1:
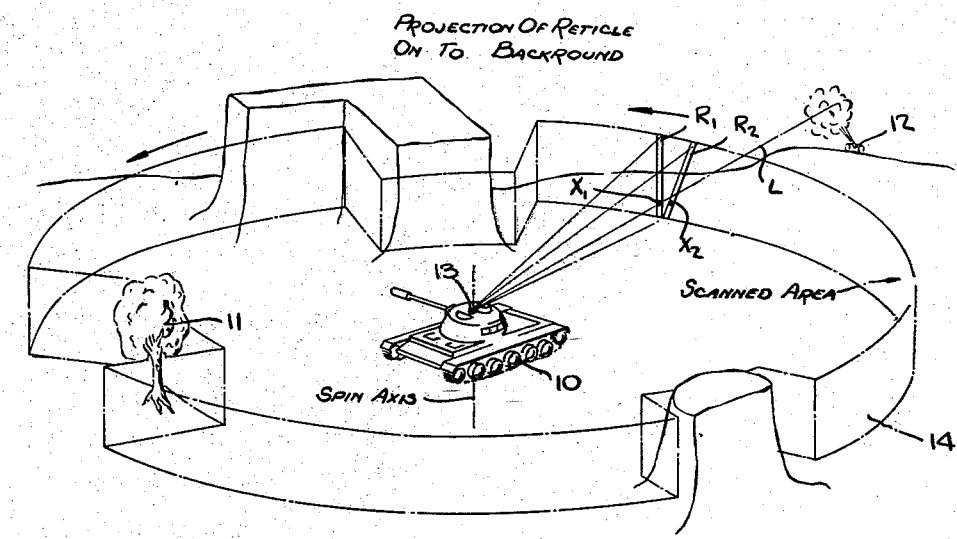
FIG. 1 is a perspective view of a tank equipped with an early warning scanning system in accordance with the invention.
Figure 2:
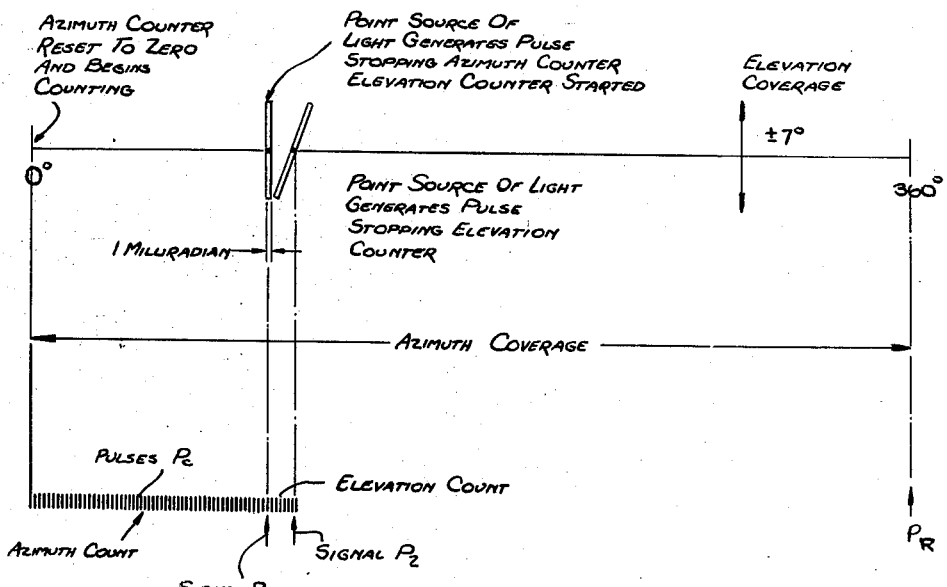
FIG. 2 is a schematic diagram illustrative of the operation of the system.

Referring now to the drawing, and more particularly to FIGS. 1 and 2, the invention is illustrated as being installed in a military tank 10, shown on a terrain which includes various obstacles such as tree 11. It is to be understood that the scanning system has many other practical applications, and may be placed at a fixed site as well as in mobile installations.

To illustrate the operation, we shall consider the radiation source as being constituted by a flash originating from a gun 12 placed on a hill, so that the gun is elevated with respect to the tank. The purpose of the invention is to locate the gun position both as to its angular position in the horizontal plane relative to the tank (azimuth) as well as its relative angular position in the vertical plane (elevation).

To this end there is mounted above the turret of the tank a scanning head 13 which spins about a vertical axis so that it scans the horizon at a high repetition rate. The optical system of the scanning head is provided with a reticle having two slits $R_1$ and $R_2$ and in FIG. 1, these slits are projected onto the scanned area 14 surrounding the tank. Slit $R_1$ is vertically oriented, whereas slit $R_2$ is tilted relative to slit $R_1$, the slits having the same extension in the vertical plane.

The scanner must be capable of detecting very short bursts of energy whose duration is in the order of a few milliseconds. By spinning the head at 6000 r.p.m., it becomes possible to detect signals of 10 milliseconds duration or longer. The high spin rate and the accuracy to which the line of sight must be maintained require a rigid and precisely constructed mechanism with good bearing tolerances.

The scanning movement is illustrated as being counter-clockwise. As the horizon is scanned an angular position is reached which the vertical slit is in line optically with the gun site 12 and consequently infra-red or visible energy will pass therethrough and strike a sensitive element or detector to produce a first signal pulse $P_1$. The line of sight is represented by line L and it will be seen that because the site 12 is elevated relative to the tank, the line L intercepts the slit $R_1$ at a point $X_1$ raised above the lowest point therein.

The first signal pulse is momentarily produced and with the continued movement of the scanner the radiation from the source then penetrates the inclined slit $R_2$ at point $X_2$ to produce a second signal pulse $P_2$. Point $X_2$ is at a position in slit $R_2$ above the lowest position therein which corresponds to point $X_1$. It will be noted that the distance horizontally between points $X_1$ and $X_2$ varies as a function of the elevation of these points. The time therefore between pulses $P_1$ and $P_2$ is determined not only by the spinning speed but also by the elevation of the infra-red source, for the higher the source, the higher the positions of points $X_1$ and $X_2$ and hence the greater the distance therebetween.

A counter pulse $P_c$ is generated internally for each angular fraction or increment of scanning movement, preferably one per milliradian through which the optical axis turns. A first electronic counter totals the pulses $P_c$, the counter being reset once each scanning revolution. When a signal $P_1$ due to a gun flash is received at the detector, the counter is arrested to give the azimuth angle relative to the source. When the first counter stops, a second counter immediately proceeds to count the pulses $P_c$, the operation being arrested when the second signal $P_2$ is received. Thus the aggregate count in the second counter represents the distance between points $X_1$ and $X_2$ in the slits and hence the exact elevation angles.

It will be seen that the system determines the azimuth and elevation sequentially, thereby minimizing the detector time constant and system bandwidth.

Figure 3:
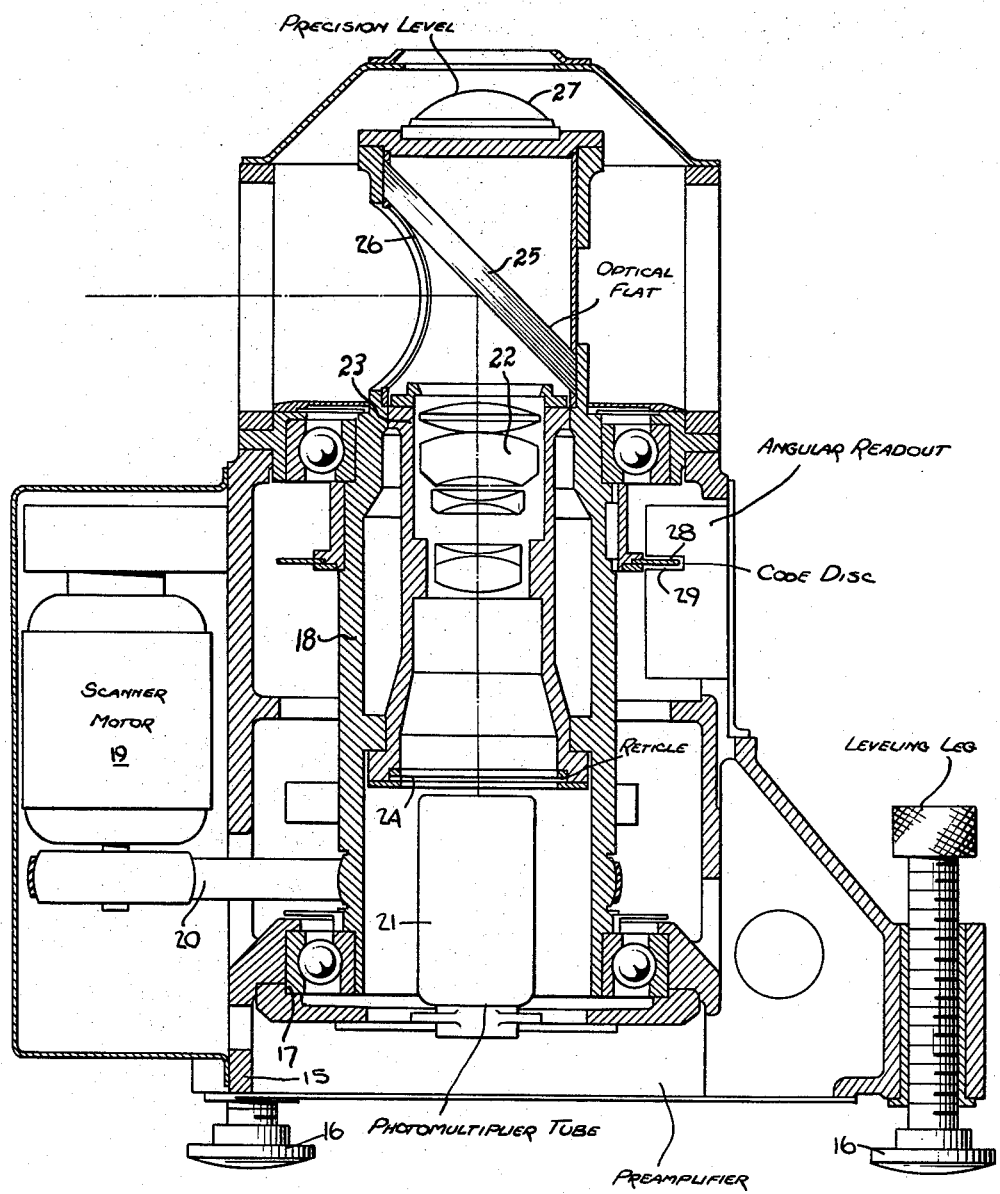
FIG. 3 is a sectional view of the scanning unit.

Referring now to FIG. 3, the scanning unit, which may be mounted on the turret of the tank comprises a frame 15 provided with leveling legs 16. Rotatably mounted within the frame on suitable precision bearings 17 is a cylindrical tube 18, the tube being aligned for rotation about a vertical axis. The tube is driven by a speed regulated motor 19 operatively coupled to the tube by a continuous belt 20.

Coaxially mounted within tube 18 at a fixed position at the lower end thereof is an infra-red detector 21 which may take the form of a photomultiplier tube having a radiation sensitive surface. Mounted above the face of the detector is a lens system 22 disposed within a barrel 23 supported within tube 18 for rotation therewith. Attached to the lower end of the barrel is a reticle plate 24 having the slits $R_1$ and $R_2$.

Supported within the upper end of the tube 18 at a 45° angle to the axis thereof is an optical flat 25, the tube having a lateral opening 26 cut therein to admit radiation. At the uppermost end of tube 18 there is mounted a precision leveling device 27 to ensure vertical alignment. Secured to tube 18 at an intermediate position thereon is an annular code disc 28 which rotates therewith and operates in conjunction with a readout device 29 to provide a count pulse $P_c$ for each milliradian of movement and a reset $P_r$ once each 360°.

Thus as the tube spins, the optical flat, the lens system and the reticle turn relative to the face of the detector and the horizon is effectively scanned for radiation. Commercial optics and detectors may be used. A good commercial lens will have a resolution which exceeds 50 lines/mm. at the edges of the field at maximum aperture. Letting one line equal ⅓ milliradian the required focal length is about 75 mm. One lens satisfactory for this purpose is a Steinheil Quinar $f/2.8$ 75 mm. focal length lens with a useful field of view of about 30° (42 mm.). Thus radiant energy entering opening 26 in a direction normal to the vertical axis of the tube is reflected by optical flat 25 axially down the lens barrel toward the detector 21 through the reticle plate.

Referring now to FIG. 4, we shall first reconsider the scanning unit. The photomultiplier 21 may in practice have a trialkali photocathode (such as EM1 type 9558) having a diameter of 44 mm. The structure of the reticle plate is shown separately in FIG. 5 and is provided with exposure slits $R_1$ and $R_2$, the photomultiplier being activated only when energy passes through the slits. The 44 mm. photocathode fills the focal plane of the optics. At a sensitivity of 500 amps./lumen the dark current is 0.006 microampere. The signal which is generated as the slit in the reticle scans the image of the point source is a pulse which must be located in time to the following accuracy:

$$\frac{\text{System resolution in milliradians} \times 60}{\text{Scan speed in r.p.m.} \times 6280} \text{ seconds}$$

For a 1 milliradian system the detector time constant must be faster than 1.6 microseconds. This of course is well within the capability of standard photomultipliers.

The elevation circuits require a time resolution expressed by $$\frac{\theta}{360} \times \frac{60}{\text{scanner r.p.m.}} \times \frac{1}{2\phi \times 17.4} \text{ seconds}$$

where $$\theta = \tan^{-1}\left\{[\tan \phi] \tan \left[\cos^{-1} \frac{\tan \phi}{\tan \delta}\right]\right\}$$

$\phi$ is the elevation angle in degrees $\delta$ is the maximum effective half field of view of the lens in degrees.

Equating this to the time resolution required by the azimuth channel (1.6 μ sec.) and solving gives:

Maximum elevation angle $(2\phi) = 14°$ $(\pm 7°)$

The limiting system noise for the contemplated application is a function of the dark current. As given by the shot noise formula $(2ei\Delta f)^{\frac{1}{2}}$ this is 180 microvolts. A minimum S/N of 10 will assure a low false alarm rate, therefore, the minimum effective signal out of the photomultipler will be about 2 millivolts.

Photomultiplier 21 is energized by a high voltage supply 30 and generates pulses $P_1$ and $P_2$ successively in response to radiant energy entering slits $R_1$ and $R_2$. The output of the detector must be amplified to operate the counters. A gain of 1000 with a bandwidth of 10–100,000 c.p.s. is desirable for good angular resolution. To permit reasonable cable lengths, a pre-amplifier impedance converter 31 is connected to the output of the detector, the pre-amplifier feeding a main amplifier 32.

The counting pulses $P_c$ are produced by code disc 28, shown separately in FIG. 6, which spins with the optical system and is composed of 6280 alternately clear and opaque radial strips circumferentially arranged. In FIG. 6 it is to be assumed that the lines 33 represent the clear area through which light will pass. The read off device 29 includes a light source 34 whose rays are projected through the disc and picked up by a light detector 35 to produce one pulse $P_c$ per radial line. In addition, the disc is provided with one oversize line 36 which is in conjunction with a detector 35a arranged to respond only to this line to produce a single pulse $P_r$ per full revolution of the disc. The number of pulses $P_r$ produced per minute is 6000, which is the spin rate, and the number of pulses $P_c$ produced per minute is therefore $6280 \times 6000$. Hence the counter must be capable of counting at 630,000 p.p.s.—i.e., have a minimum bandwidth of 10–36,000 c.p.s.

An azimuth counter 37 is provided which may be of any standard digital electronic design and have provision for three inputs; namely a count input to which is applied the pulses $P_c$ from device 35, a stop input to which is applied the signal pulse $P_1$ from amplifier 32 and a reset input to which is applied reset pulse $P_r$ once each revolution from device 35a. Reset should occur within 1.6 microseconds to avoid a count loss in the next cycle of operation.

The count pulses $P_c$ are also applied to the count input of an elevation electronic counter 38, but this counter is reset to zero by signal pulse $P_1$ from amplifier 32 which is applied to the reset input through an electronic commutating switch 39. Thus the signal pulse $P_1$ which represents the azimuth position and causes the azimuth counter to stop to provide a count total indicative of azimuth also acts to reset counter 38 whereby the elevation count commences at the termination of the azimuth count.

The next pulse $P_2$, reflecting the displacement between points $X_1$ and $X_2$ on the slits and hence the elevation, act through electronic switch 39 to stop the elevation counter to provide the elevation count. It also is applied to the stop input of the first counter 37 but since this has already been stopped it has no effect thereon.

In summary, when the vertical slit in the scanner momentarily is in line with the source of infra-red or visible energy, a first signal pulse is produced which arrests the azimuth counter so that totalled therein is the pulse count representing the number of counts generated between the zero position and the angular position at which the first signal is produced. As the scanner moves to bring the inclined slit in line with the source a second signal pulse is produced to stop the elevation counter so that totallized therein is the number of pulses generated between the two slits.

While there has been shown what is considered to be a preferred embodiment of the invention, it is to be understood that many changes and modifications may be made therein without departing from the spirit of the invention. For example, the pulses $P_r$ may be produced electro-mechanically in combination with the rotating tube. It is intended therefore in the appended claims to cover all such changes and modifications as fall within the true scope of the invention.

What is claimed is:

1. A detection system for locating a point source of radiation comprising a scanner unit which spins about a vertical axis to view the horizon and includes a detector sensitive to incoming radiant energy and a reticle effectively disposed in front of said detector and having a vertical slit and an adjacent tilted slit whereby energy from said point source first enters said vertical slit and then said tilted slit to produce first and second signal pulses, the first of which is generated when said unit is in angular alignment with said point source and the second of which is subsequently produced at a time dependent on the elevation of said source relative to said unit, means responsive to the time position of said first pulse relative to a reference to determine the azimuth of said point, and means responsive to the time displacement between said first and second pulses to determine the elevation of said point.

2. A detection system comprising a scanner unit which turns about a vertical axis to view the horizon and which includes a detector sensitive to incoming radiant energy and a reticle effectively disposed in front of said detector and having a vertical slit and an adjacent tilted slit whereby energy from a point source first enters said vertical slit and then said tilted slit to produce first and second signal pulses, the first of which is generated when said unit is in angular alignment with said point source and the second of which is subsequently produced at a time dependent on the elevation of said source relative to said unit, means to generate periodic counting pulses as said unit undergoes incremental changes in angular position, means to count the number of counting pulses generated from a reference position to the angular point at which said first signal pulse is produced to determine the azimuth of said source, and means to count the number of counting pulses generated in the interval between said first and second signal pulses.

3. A detection system as set forth in claim 2, wherein the spin rate of said scanner unit is about 6,000 r.p.m.

4. A detection system as set forth in claim 2, wherein said counting pulses are produced one per milliradian of movement.

5. A detection system for locating a point source of radiation comprising a scanner unit which spins about a vertical axis at a high rate to view the horizon and which includes a detector sensitive to incoming radiant energy and a reticle effectively disposed in front of said detector and having a vertical slit and an adjacent tilted slit whereby said energy first enters said vertical slit and then said tilted slit to produce first and second signal pulses, the first of which is generated when said unit is in angular alignment with said point source and the second of which is subsequently produced at a time dependent on the elevation of said source relative to said unit, means to generate periodic counting pulses as said unit undergoes incremental changes in angular position, a first digital counter to add the number of counting pulses generated from a reference position to the angular point at which said first signal pulse is produced to determine the azimuth of said source, and a second digital counter to add the number of counting pulses generated in the interval between said first and second signal pulses.

6. An early warning scanning system for locating a point source of radiation in azimuth and elevational coordinates comprising a scanning unit including a detector sensitive to incoming radiant energy and optical means to scan the surrounding area about a vertical axis and provided with a reticle having a vertical slit and an adjacent tilted slit to project said energy onto said detector whereby said energy first enters said vertical slit and then said tilted slit to produce first and second signal pulses, the first of which is generated when said unit is effectively disposed in angular alignment with said point source, the second pulse being subsequently produced at a time dependent on the elevation of said point source relative to said unit, means to produce a counting pulse for each milliradian of spin movement and a reset pulse upon the completion of each spin revolution, first and second digital pulse counters responsive to said counting pulses to add same, means coupled to said detectors and responsive to said first signal pulse to stop said first counter whereby the count totallized therein represents the azimuth position of said scanning unit when said first signal pulse is received and to reset said second counter whereby counting operation therein is initiated at the same instant, and means responsive to said second signal pulse to stop said second counter whereby the count totalled therein represents the elevation of said point source.

7. An early warning scanning system for locating a point source of radiation in azimuth and elevational coordinates comprising a scanning unit including a detector sensitive to incoming radiant energy and optical means to scan the surrounding area about a vertical axis and provided with a reticle having a vertical slit and an adjacent tilted slit to project said energy onto said detector, whereby said energy first enters said vertical slit and then said tilted slit to produce first and second signal pulses, the first of which is generated when said unit is effectively disposed in angular alignment with said point source, the second pulse being subsequently produced at a time dependent on the elevation of said point source relative to said unit, a code disc operatively coupled to said optical means to spin therewith and provided with circumferentially arranged strips which are alternately transparent and opaque, a read-out device operatively coupled to said disc to produce a counting pulse for each angular increment of spin movement and a reset pulse upon the completion of each spin revolution, first and second pulse counters responsive to said counting pulses to add same, means coupled to said detector and responsive to said first signal pulse to stop said first counter whereby the count totallized therein represents the azimuth position of said scanning unit when said first signal pulse is received and to reset said second counter whereby counting operation therein is initiated at the same instant, and means responsive to said second signal pulse to stop said second counter whereby the count totalled therein represents the elevation of said point source.

8. An early warning scanning system for locating a point source of radiation in azimuth and elevational coordinates comprising a scanning unit including a photomultiplier sensitive to incoming radiant energy mounted at a fixed position and a rotatable optical means to scan the surrounding area about a vertical axis at a relatively high speed and provided with recticle having a vertical slit and an adjacent tilted slit to project said energy onto said photomultiplier, whereby said energy first enters said vertical slit and then said tilted slit to produce first and second signal pulses, the first of which is generated when said unit is effectively disposed in angular alignment with said point source, the second pulse being subsequently produced at a time dependent on the elevation of said point source relative to said unit, a code disc operatively coupled to said optical means to spin therewith and provided with circumferentially arranged strips which are alternately transparent and opaque, a read-out device operatively coupled to said disc to produce a counting pulse for each milliradian of spin movement and a reset pulse upon the completion of each spin revolution, first and second digital pulse counters responsive to said counting pulses to add same, means coupled to said photomultiplier and responsive to said first signal pulse to stop said first counter whereby the count totallized therein represents the azimuth position of said scanning unit when said first signal pulse is received and to reset said second counter whereby counting operation therein is initiated at the same instant, and means responsive to said second signal pulse to stop said second counter whereby the count totalled therein represents the elevation of said point source.

9. An early warning scanning system for locating a point source of radiation in azimuth and elevational coordinates comprising a scanning unit including a detector sensitive to incoming radiant energy mounted at a fixed position and rotatable optical means to scan the surrounding area about a vertical axis at a relatively high speed and provided with a recticle having a vertical slit and an adjacent tilted slit to project said energy onto said detector, whereby said energy first enters said vertical slit and then said tilted slit to produce first and second signal pulses, the first of which is generated when said unit is effectively disposed in angular alignment with said point source, the second pulse being subsequently produced at a time dependent on the elevation of said point source relative to said unit, means to measure the time displacement between said first pulse at a reference to determine azimuth, and means to measure the time displacement between the two signal pulses to determine elevation.

References Cited in the file of this patent

UNITED STATES PATENTS

| | | |
|---|---|---|
| 2,937,283 | Oliver | May 17, 1960 |
| 3,038,996 | Grube | June 12, 1962 |